(12) United States Patent
Zhao et al.

(10) Patent No.: US 8,725,496 B2
(45) Date of Patent: May 13, 2014

(54) CUSTOMIZATION OF A NATURAL LANGUAGE PROCESSING ENGINE

(75) Inventors: Bing Zhao, Stamford, CT (US); Vittorio Castelli, Croton on Hudson, NY (US)

(73) Assignee: International Business Machines Corporation, Armonk, NY (US)

(*) Notice: Subject to any disclaimer, the term of this patent is extended or adjusted under 35 U.S.C. 154(b) by 328 days.

(21) Appl. No.: 13/190,962

(22) Filed: Jul. 26, 2011

(65) Prior Publication Data
US 2013/0030792 A1 Jan. 31, 2013

(51) Int. Cl.
*G06F 17/27* (2006.01)
*G10L 15/00* (2013.01)

(52) U.S. Cl.
USPC ............................................. 704/9; 704/257

(58) Field of Classification Search
None
See application file for complete search history.

(56) References Cited

U.S. PATENT DOCUMENTS

| | | | | |
|---|---|---|---|---|
| 5,384,703 A * | 1/1995 | Withgott et al. | | 715/236 |
| 5,619,718 A | 4/1997 | Correa | | |
| 5,768,603 A * | 6/1998 | Brown et al. | | 704/9 |
| 6,338,033 B1 * | 1/2002 | Bourbonnais et al. | | 704/3 |
| 6,374,224 B1 * | 4/2002 | Horiguchi et al. | | 704/266 |
| 6,393,389 B1 * | 5/2002 | Chanod et al. | | 704/7 |
| 7,369,998 B2 * | 5/2008 | Sarich et al. | | 704/277 |
| 7,818,282 B2 * | 10/2010 | Blackwell et al. | | 704/8 |
| 7,983,897 B2 * | 7/2011 | Chin et al. | | 704/2 |
| 8,140,322 B2 * | 3/2012 | Simonsen et al. | | 704/2 |
| 8,185,373 B1 * | 5/2012 | Messenger | | 704/2 |
| 8,229,728 B2 * | 7/2012 | Huang et al. | | 704/4 |
| 8,239,207 B2 * | 8/2012 | Seligman et al. | | 704/277 |
| 8,386,233 B2 * | 2/2013 | Khuda | | 704/3 |
| 8,401,836 B1 * | 3/2013 | Kumar et al. | | 704/2 |
| 2004/0088197 A1 | 5/2004 | Childress et al. | | |
| 2004/0215457 A1 | 10/2004 | Meyer | | |
| 2004/0236580 A1 | 11/2004 | Bennett | | |
| 2004/0243387 A1 | 12/2004 | De Brabander | | |
| 2005/0049851 A1 | 3/2005 | Watanabe et al. | | |
| 2006/0212288 A1 | 9/2006 | Sethy et al. | | |
| 2008/0010342 A1 | 1/2008 | Gebhardt et al. | | |
| 2009/0271177 A1 | 10/2009 | Menezes et al. | | |
| 2010/0023315 A1 * | 1/2010 | Quirk | | 704/3 |
| 2010/0042398 A1 | 2/2010 | Marcu et al. | | |
| 2010/0204977 A1 * | 8/2010 | Chiu et al. | | 704/2 |
| 2010/0262575 A1 | 10/2010 | Moore et al. | | |
| 2011/0029300 A1 * | 2/2011 | Marcu et al. | | 704/2 |
| 2011/0172987 A1 * | 7/2011 | Kent et al. | | 704/3 |
| 2012/0101817 A1 * | 4/2012 | Mocenigo et al. | | 704/231 |

OTHER PUBLICATIONS

Zhao et al. A Simplex Armijo Downhill Algorithm for Optimizing Statistical Machine Translation Decoding Parameters. NAACL-Short '09 Proceedings of Human Language Technologies. 2009.

(Continued)

*Primary Examiner* — Brian Albertalli
(74) *Attorney, Agent, or Firm* — Ryan, Mason & Lewis, LLP

(57) ABSTRACT

A method, an apparatus and an article of manufacture for customizing a natural language processing engine. The method includes enabling selection of one or more parameters of a desired natural language processing task, the one or more parameters intended for use by a trained and an untrained user, mapping the one or more selected parameters to a collection of one or more intervals of an input parameter to an optimization algorithm, and applying the optimization algorithm with the collection of one or more intervals of an input parameter to a model used by a natural language processing engine to produce a customized model.

24 Claims, 6 Drawing Sheets

(56) References Cited

OTHER PUBLICATIONS

Child, Text Readability Scores, http://www.addedbytes.com/lab/readability-score/, pp. 1-13, Jul. 26, 2011.

Och, Mininum Error Rate Training for Statistical Machine Translation, ACL 2003: Proc. of the 41st Annual Meeting of the Association for Computational Linguistics, Japan, Sapporo, Jul. 2003, pp. 160-167.

Chiang, A Hierarchical Phrase-Based Model for Statistical Machine Translation. In Proceedings of the 43rd Annual Meeting of the ACL, 2005, pp. 263-270.

Wu, Stochastic Inversion Transduction Grammars and Bilingual Parsing of Parallel Corpora, Computational Linguistics 23(3):377-404, Sep. 1997.

* cited by examiner

CUSTOMIZATION OF A NATURAL LANGUAGE PROCESSING ENGINE

GOVERNMENT CONTRACT

This invention was made with Government support under Contract No.: HR0011-08-C0110 (Global Autonomous Language Exploitation (GALE)) awarded by the United States Defense Advanced Research Projects Agency (DARPA). The Government has certain rights in this invention.

FIELD OF THE INVENTION

Embodiments of the invention generally relate to information technology, and, more particularly, to natural language processing systems.

BACKGROUND OF THE INVENTION

Statistical machine translation engines use a log-linear framework to combine sub-models together and integrate the sub-costs (or scores) into one single cost/score to rank the translation decisions. Such frameworks are sensitive to the weights used for the log-linear style combinations, which makes the translation engine less adaptable for different genres because the error surface of a translation model is rugged and the optimization algorithms are fragile and easily suffer from any starting points (seeds). To adapt such models, the initial seeds to the optimization algorithm are playing a key role in optimization success. In existing approaches, often such initial seeds are only obtained by random perturbs of a seed already provided in a software shipment.

The translation quality of the output text of a machine translation system is typically measured via automatic metrics including BLEU (Bilingual Evaluation Understudy), TER (Translation Edit Rate), WER (Word Error Rate), METEOR (Metric for Evaluation of Translation with Explicit Ordering), n-gram precisions, and their variants. Statistical models for natural language processing (NLP) rely on initial starting points from which they optimize an objective function given the data. Finding the optimal solution is typically hard (NP-complete) and an optimizer finds a local optimum that is highly dependent on the initial seed. Thus, the quality of the results is positively impacted by a finding a good initial seed, and a need exists in making such a finding.

SUMMARY OF THE INVENTION

In one aspect of the present invention, techniques for customization of a natural language processing engine are provided. An exemplary computer-implemented method for customizing a natural language processing engine can include steps of enabling selection of one or more parameters of a desired natural language processing task, the one or more parameters intended for use by a trained and an untrained user, mapping the one or more selected parameters to a collection of one or more intervals of an input parameter to an optimization algorithm, and applying the optimization algorithm with the collection of one or more intervals of an input parameter to a model used by a natural language processing engine to produce a customized model.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and operative to perform noted method steps. Yet further, another aspect of the invention or elements thereof can be implemented in the form of means for carrying out the method steps described herein, or elements thereof; the means can include (i) hardware module(s), (ii) software module(s), or (iii) a combination of hardware and software modules; any of (i)-(iii) implement the specific techniques set forth herein, and the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION OF EMBODIMENTS

Figure 1:
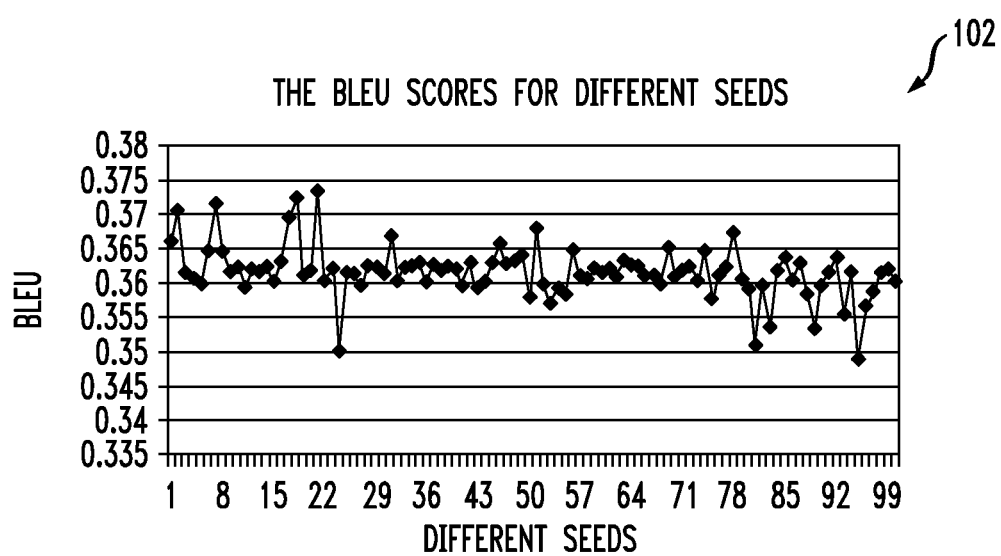
FIG. 1 is a diagram illustrating examples of seed-choices for influencing the optimization algorithms to reach different local optimum, according to an embodiment of the present invention.

Principles of the invention will be illustratively described herein in the context of one or more automated machine translation systems. However, it is to be appreciated that the principles of the invention are not limited to any particular system architecture and are more generally applicable to any natural language processing system in which it would be desirable to optimize one or more results associated with the natural language processing system.

As used herein, the phrase "natural language processing" (NLP) generally refers a field of computer science and linguistics related to interactions between computers and human (natural) languages. Thus, since a machine translation system is an example of a natural language processing system, "machine translation" generally refers to a technique for translating, under control of a computer system, text in a first natural language (by way of example only, the English language) to text in a second natural language (by way of example only, one of the Chinese family of languages or the Italian language).

It is to be further understood that the text input to the machine translation system may be generated via an automated speech recognition (ASR) system which, as is known, receives spoken utterances from a speaker and converts (decodes) the spoken utterances to text. Thus, a speaker could speak in the first natural language, and the ASR resulting text would serve as the input to the machine translation system. Similarly, the text that is output in the second natural language by the machine translation system could serve as an input to an automated text-to-speech (TTS) system which, as is known, converts the text to speech that is audibly presented to a listener in the second natural language. However, it is to be appreciated that principles of the invention focus on machine translation systems (more generally, natural language processing systems) and not ASR or TTS systems.

Existing data-driven approaches ignore the spectrum of the potential customers (they fail to model users as belonging to discrete groups or to a distribution), which can lead to lower translation quality for potential customer groups. As a consequence, for example, existing approaches cannot handle both naïve and sophisticated users, that is, the systems are optimized for an "average customer's" need at the expense of specific customer group's needs. The straight alternative of substituting the average metric by a metric that gives more weight to a specific domain/group is usually not desired either. For example, if the approach is optimized for advanced users on the complex (difficult) materials, for example, technical jargons in chemistry, there is a risk to reduce the quality of the translations of the easy materials used by majority of users. Finally, indiscriminately adding more data is both expensive (collecting parallel corpora is a labor-intensive work, requiring multiple human translation of the same documents) and ineffective (it is practically impossible to collect enough data to cover all possible scenarios of interest to the sophisticated users as well as to collect the extremely fluid web/community content that a typical user is exposed to everyday).

Accordingly, as described herein, an aspect of the present invention includes reducing adaptation costs via manually adjusting the synchronous grammar structures in syntax-based machine translation engines. One embodiment of the invention includes finding an initial seed based on end-user input. For translation engines, the techniques include exposing key grammar components and providing user interface (UI) mechanisms for the user to adjust the relevance of the components. This automatically translates into an initial seed, with upper and lower bounds, for the optimization algorithms to improve the domain specific translations with increased speed.

As detailed herein, an aspect of the invention includes a human/computer interface for obtaining the seed for automatic optimization/adaptation. Additionally, another aspect of the invention includes a framework for building a translation engine that supports such human/computer interactions.

A synchronous grammar configurable through human/computer interaction provides flexibility via providing an initial guess of the weights for adjusting the translation engine parameters for a user's data. The user can specify characteristics of the material to be translated (for example, if the material is inherently monotone for the speech conversation data, or more reordering is expected for a formal newswire or lyrics).

The limited amount of human/computer interactions, as described herein, can be useful for users to quickly establish a better baseline, or starting point, for any further adaption and optimizations. Accordingly, the users and automatic programs can save on the cost of collecting user data for adapting the translation engine in predefined ways, and accelerate the optimization algorithm to reach better results.

The techniques detailed herein can be used for bilingual/multilingual translation between language pairs. Further, an aspect of the invention is used for natural language processing and includes a statistical model. Also, in one or more embodiments of the invention, the user does not see any rule in conjunction with the techniques described herein. The interface is used to infer the difficulties of the user specific data for translation, and an aspect of the invention infers the seeds and bounds for running an optimization algorithm to adjust parameters at the same time.

In one illustrative embodiment, the optimization algorithm uses a more generalized algorithm than those used in existing approaches, that is, an algorithm referred to as a simplex-downhill algorithm. The simplex-downhill algorithm is a linear-search technique based on heuristics, and is realized to be more effective than the standard Minimum Error-Rate training, or MER. See, B. Zhao et al., "A Simplex Armijo Downhill Algorithm for Optimizing Statistical Machine Translation Decoding Parameters," Proceedings of the North American Chapter of the Association for Computational Linguistics—Human Language Technologies (NAACL HLT-2009), Denver, Colo., USA, the disclosure of which is incorporated by reference herein in its entirety. The algorithm starts with a seed K-dim weight vector, corresponding to a point in the (K-1)-dim simplex. The techniques further loop over each dim, and transform this original seed into a point in the high-dim by setting k-th dim to be its upper bound and lower bound. As such, there results a "ball" (or "snowball") in the high-dim space. Using this "snowball," during optimization, four operators are iteratively applied—expansion, contraction, reflection, and Armijo-line search—to roll the snowball to a better space containing the optimal solutions and shrink it until a local optimal is reached.

The Armijo algorithm changes the trajectories for the simplex to shrink to a local optimal, and empowers the algorithm a better chance to walk out of the riddled error surface computed by automatic machine translation (MT) evaluation metrics.

As noted, a preferred embodiment of the invention can be used for domain adaptation of a translation system from one human language (source language) to a different one (target language). In such an embodiment, a generic translation system from the source to the target language already exists, and a user is interested in improving the system's performance on a specific domain (for example, translating speech transcripts). Consider that speech transcripts are typically characterized by shorter sentences than, for example, formal documents, with a simpler structure that might require less reordering as well.

The user is presented with an interface with several controls (for example, dials) that capture aspects of the type of data to be translated (for instance, the typical length of the sentence (from fragmentary to very long), the nature of the content (from general to very domain-specific), the quality of the prose (from ungrammatical to textbook style), whether there are expected interjections (none to many), etc.). The user is enabled to make selections using the UI (for example, medium length sentences, generic content, ungrammatical sentences, and fragmentary prose). The values are mapped to intervals for the initial seed (as described herein), and the model is adapted using the resulting seed.

Additionally, another aspect of the invention provides feedback to the user. For example, feedback can be provided in the form of documents with the translation from the original system and the translation from the adapted system. With such feedback, the user can decide to iterate the process.

As noted above, an aspect of the invention includes building an engine to support the manually adjustable scheme to improve the initial seeding for any predefined adaptation process. Translation quality is improved by providing a user with controls that do not require knowledge of how the translation algorithm operates. The values selected by the user are mapped to a range of values for the parameters used by an optimization algorithm, the optimization algorithm is seeded with these parameters, and the optimization algorithm is used to adapt the translation model. Accordingly, using appropriate seeds for the optimization algorithm improves the translation quality for specific domains.

FIG. 1 is a graph 102 illustrating examples of seed-choices for influencing the optimization algorithms to reach different local optimum, according to an embodiment of the present invention. As illustrated in FIG. 1, a bad seed choice can lead to sub-optimal optimization results, confuse users, and hurt satisfactions. A good seed selection, however, can lead to faster convergence to the optimal point, and improve the user experience.

One aspect of the invention includes mapping between human-centric metrics and seed parameters for an optimization algorithm. Human-centric metrics can refer, for example, to parameters easily understandable by a non-technical, untrained person, including, but not limited to, the length of a typical sentence, the intended use of the translation, the general topic of the text, etc. A good seed can already involve search efforts, and this search process can include upper bound, lower bound, and relative strength of monotone, hiero, tree-to-string, string-to-tree probabilistic synchronous context-free grammar (PSCFG). One or more embodiments of the invention include a set of predefined upper and lower bounds for different genre types that are learnt from training data for system building via either supervised or unsupervised learning. The human input can then be mapped to the predefined ranges for seeds.

Additionally, an aspect of the invention includes regressions/least squares estimation (LSE) for converting human input into the upper-bound and lower-bound for the weights associated with grammar structures. In one embodiment, a user selects scores for examples, and the system maps these scores to an interval using, for example, a regression algorithm.

Further, an aspect of the invention includes learning a linear-regression algorithm to convert the human input to transform the upper/lower bound for optimizations. Accordingly, this can include providing sentences for user to label with a scale (for example, from [1-5], with 1 being the easiest and 5 the most difficult sentence for the user). Additionally, these labeled sentences can be saved in a vector $\alpha$. Internal readability scores are computed and saved in a vector $\beta$. The regression or least-square-errors parameters $\bar{\lambda}$ are compared by transforming $\beta$ to $\alpha$ with minimal square errors: $\alpha = \bar{\lambda}\beta + \epsilon$, where $\epsilon$ is a residue error between predicted human-rating scores and internal machine rating scores. The same parameter $\bar{\lambda}$ can be used to predict or determine the upper-bound and lower-bound for each exposed grammar components, and the seeds defined from [lower-bound, upper-bound] can be used for any follow-up optimizations.

In one or more embodiments of the invention, a training set is constructed by collecting a collection of documents, tuning (for example, via an expert) the parameters of the optimizer for each of the documents, and having a group of humans individually select the parameters in the UI to describe their perception of each document. This collected data is then used in conjunction with a method to learn the mapping between the user inputs and intervals for the parameters (such as, for example the linear regression method described above).

In another embodiment, the user provides the system with a set of representative documents, and the system automatically analyzes the documents and assigns to them scores (such as, for example, the Flesch-Kincaid Grade Level, the Gunning-Fog Score, the Coleman-Liau Index, and the SMOG Index). The distribution of these scores is then used in conjunction with a mapping method such as the one described herein to identify intervals for the optimization parameters.

In such an embodiment, the user is not asked to provide values of human-understandable parameters, but rather to provide specific representative examples of the types of documents to be translated. Using these documents, one or more embodiments of the invention automatically computes a variety of quantities and constructs from the collection of these values a set of intervals for the parameters of the optimization algorithm. Additionally, one of skill in the art will appreciate that a number of possible mechanisms exist to specify example documents, including interactive turn-taking approaches where the system iteratively provides additional suggestions to the user and the user selects or rejects the suggestions.

In another aspect of the invention, the system can come with a collection of pre-specified sets of intervals for the parameters, each set of inputs corresponding to a specific domain, built by previous users or by the provider of the software. In this embodiment, the system uses the examples or the human-specified parameters provided by the user to select one of the pre-specified sets of parameters. In such an embodiment, the user is assured to end up with a system that has proven parameters, and may require fewer examples from the user. Additionally, if the number of examples is large enough, the system can construct a new set of intervals for the parameters.

Figure 2:
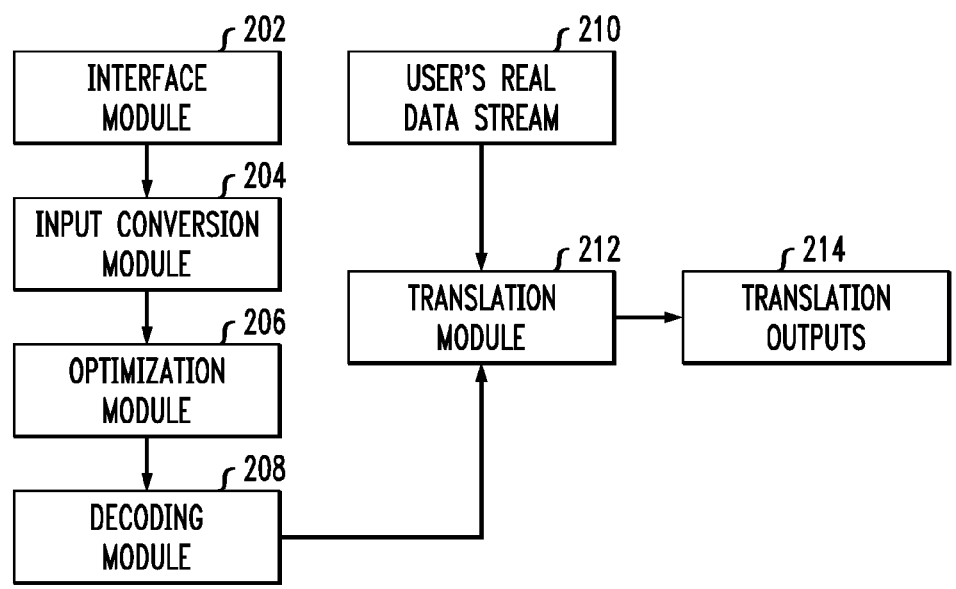
FIG. 2 is a block diagram illustrating an example embodiment, according to an aspect of the invention.

FIG. 2 is a block diagram illustrating an example embodiment, according to an aspect of the invention. By way of illustration, FIG. 2 depicts an interface module 202 for soliciting user input for his or her data of interests. Input conversion module 204 converts the user input into an upper bound, lower bound, or initial starting point for an optimization. Also, an optimization module 206 executes the optimization algorithms with the given upper/lower bound or initial seed, and decoding module 208 applies the adapted weights for decoding in the software. Additionally, the user's real data stream 210 is also provided to translation module 212, which uses the adapted system to provide the translations for the user data, thereby generating translation outputs 214.

Figure 3:
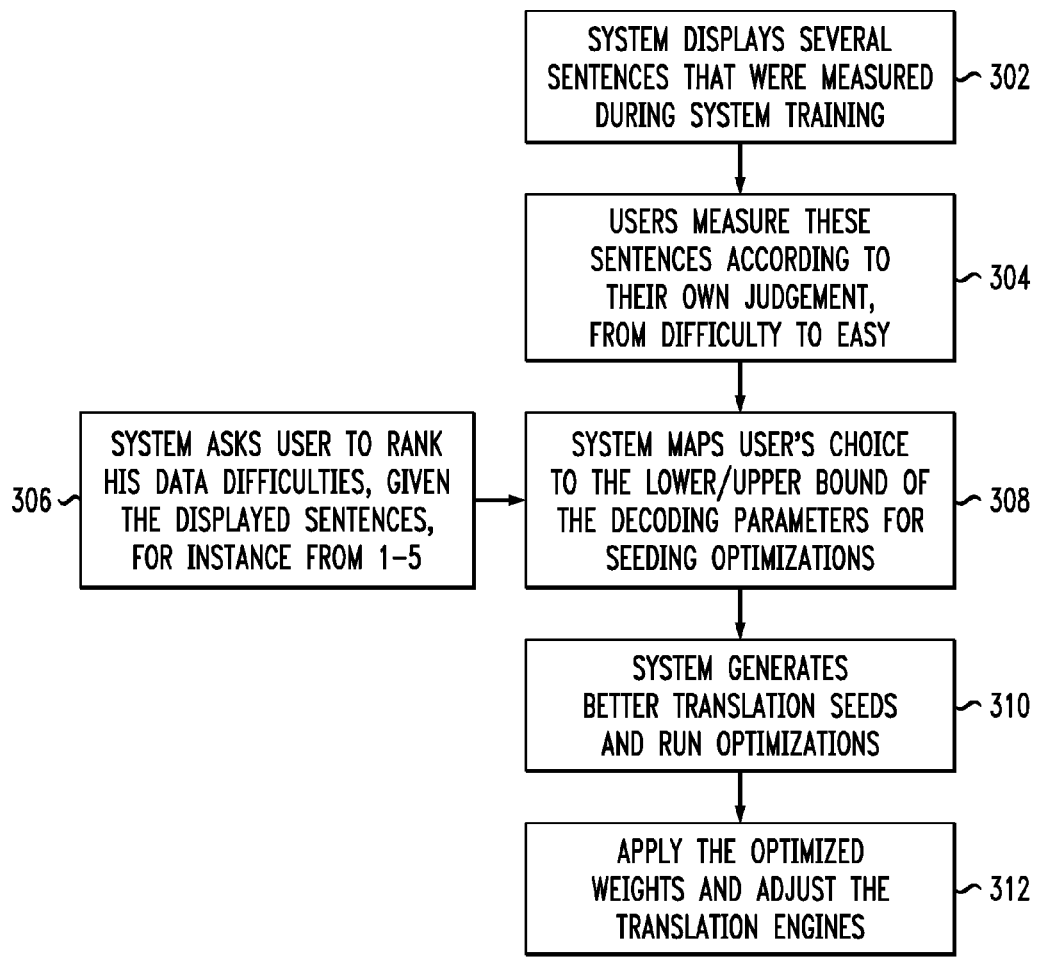
FIG. 3 is a diagram illustrating an example embodiment, according to an aspect of the invention.

FIG. 3 is a diagram illustrating an example embodiment, according to an aspect of the invention. By way of illustration, in step 302, the system (via a user interface) displays several sentences that were measured during system training. In step 304, users measure these sentences, according to his or her own judgment, from difficult to easy. Additionally, in step 306, the system asks the user to rank his or her data difficulties, given the displayed sentences, for an instance from 1-5. Accordingly, in step 308, the system maps the user's choice(s) to the lower/upper bound of the decoding parameters for seeding optimization.

In step 310, the system generates better/more accurate translation seeds and runs optimizations. Further, in step 312, the system applies the optimized weights and adjusts the translation engines.

Figure 4A:
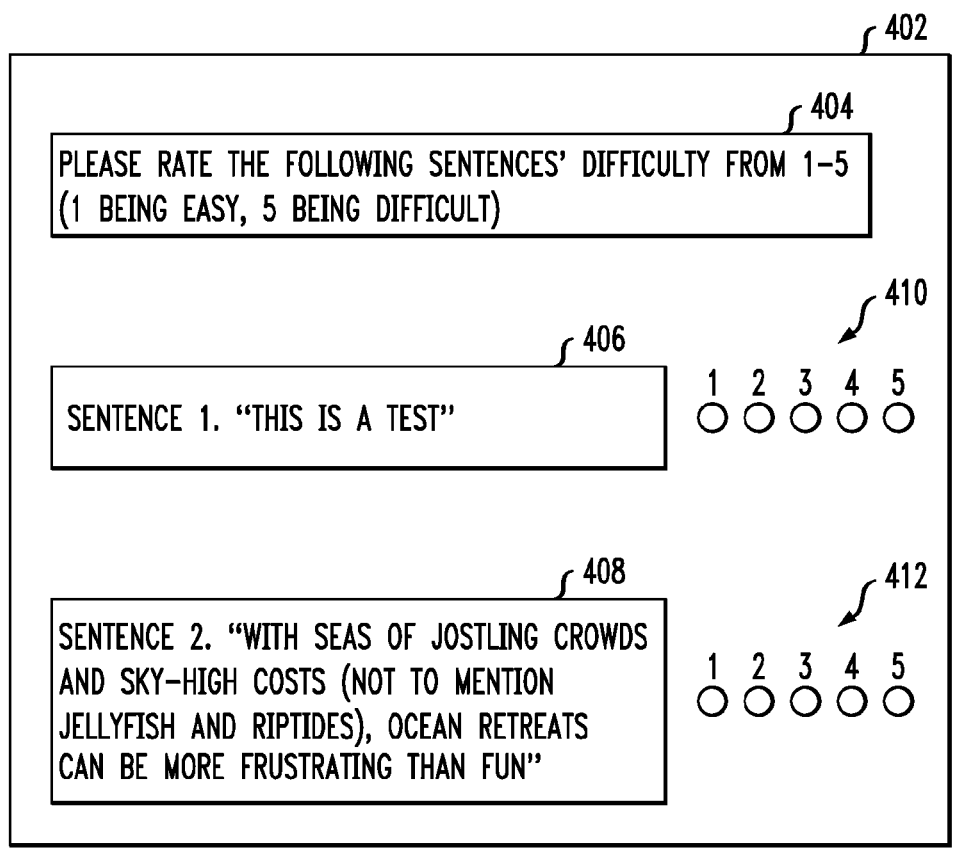
FIG. 4A is a block diagram illustrating a user interface for displaying pre-measured sentences from system training, according to an aspect of the invention.

FIG. 4A is a block diagram illustrating a user interface 402 for displaying pre-measured sentences from system training, according to an aspect of the invention. By way of illustration, FIG. 4A depicts an instruction component 404, sentence queries 406 and 408, and rating components 410 and 412.

Figure 4B:
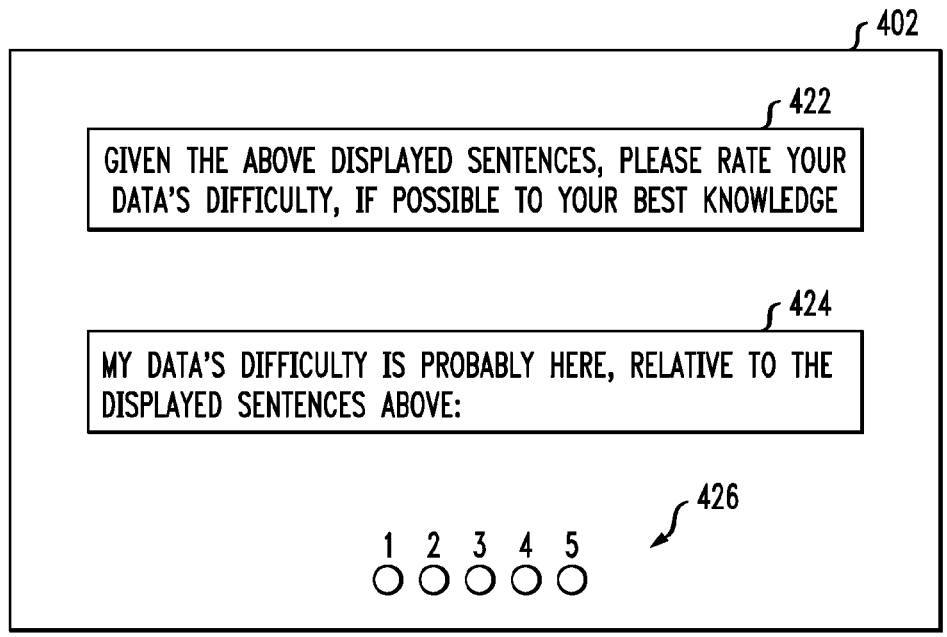
FIG. 4B is a block diagram illustrating a user interface for soliciting user input, according to an aspect of the invention.

FIG. 4B is a block diagram illustrating a user interface 402 for soliciting user input, according to an aspect of the invention. By way of illustration, FIG. 4B depicts an instruction component 422, a query response component 424, and a rating component 426.

Figure 4C:
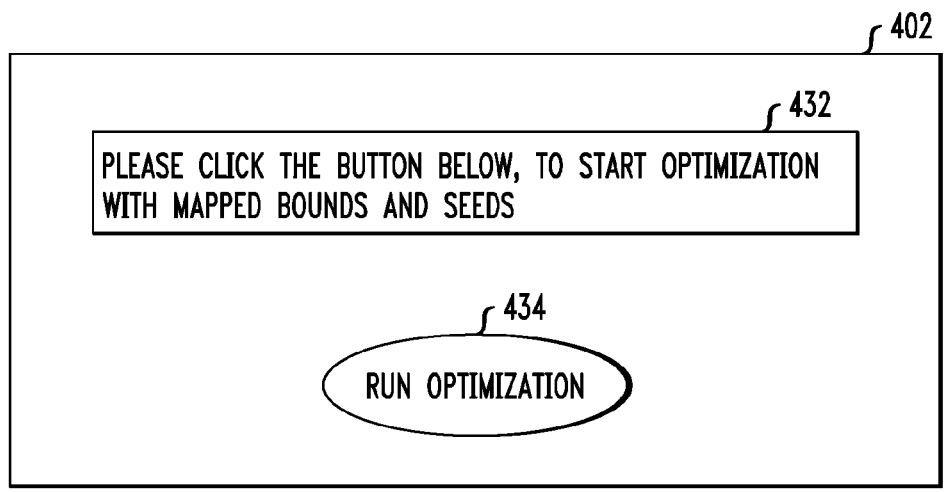
FIG. 4C is a block diagram illustrating a user interface for confirming user input and starting an optimization process, according to an aspect of the invention.

FIG. 4C is a block diagram illustrating a user interface 402 for confirming user input and starting an optimization process, according to an aspect of the invention. By way of illustration, FIG. 4C depicts an instruction component 432 and a run optimization prompt component 434.

Figure 5:
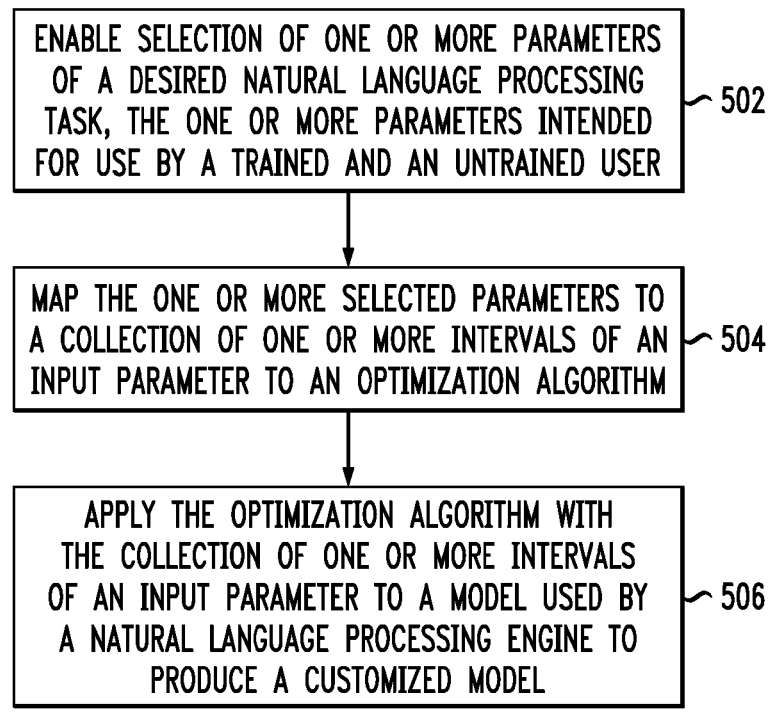
FIG. 5 is a flow diagram illustrating techniques for customizing a natural language processing engine, according to an embodiment of the invention.

FIG. 5 is a flow diagram illustrating techniques for customizing a natural language processing engine, according to an embodiment of the present invention (wherein at least one of the steps is carried out by a computer device). Step 502 includes enabling selection of one or more parameters of a desired natural language processing task (for example, a multilingual translation between a language pair), the one or more parameters intended for use by a trained and an untrained user. This step can be carried out, for example, using an interface module. The parameters can include parameters understandable by an untrained user (for example, human-centric parameters). For example, parameters can include length of a typical sentence, nature of content, quality of prose, number of expected interjections, intended use of a translation, and general topic of a text input. Also, the parameters can include pre-defined values.

Enabling selection of parameters of a desired natural language processing task can include providing a user-interface for a user to select parameters of a desired natural language processing task. Also, enabling selection of parameters of a desired natural language processing task can include enabling adjustment of relevance of one or more grammar components in the natural language processing task.

Step 504 includes mapping the one or more selected parameters to a collection of one or more intervals of an input parameter to an optimization algorithm. This step can be carried out, for example, using a conversion module. Mapping the selected parameters to a collection of intervals of an input parameter to an optimization algorithm can include using a trainable mapping method. A mapping method can be trained using data collected from one or more expert users. Additionally, the selected parameters can be automatically translated into an initial seed, with an upper and lower bound.

Step 506 includes applying the optimization algorithm with the collection of one or more intervals of an input parameter to a model used by a natural language processing engine to produce a customized model (for an end user). This step can be carried out, for example, using an optimization module.

The techniques depicted in FIG. 5 can also include providing feedback to a user, for example, in the form of a document with a translation from the original model and a translation from the customized model. An aspect of the invention can additionally include applying a linear-regression algorithm to convert human input to transform an upper and lower bound for an optimization.

Further, the techniques depicted in FIG. 5 include constructing a training set by collecting a collection of one or more documents, tuning at least one parameter of an optimizer for each document, and selecting the at least one tuned parameter to correspond to each document. Additionally, an aspect of the invention can include automatically analyzing a set of representative documents and assigning a score to each document to be used in conjunction with a mapping method to identify intervals for an optimization parameter.

The techniques depicted in FIG. 5 can also, as described herein, include providing a system, wherein the system includes distinct software modules, each of the distinct software modules being embodied on a tangible computer-readable recordable storage medium. All the modules (or any subset thereof) can be on the same medium, or each can be on a different medium, for example. The modules can include any or all of the components shown in the figures. In an aspect of the invention, the modules include an interface module, an input conversion module, an optimization module, a decoding module, and a translation module that can run, for example on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 5 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code are downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and operative to perform exemplary method steps.

Figure 6:
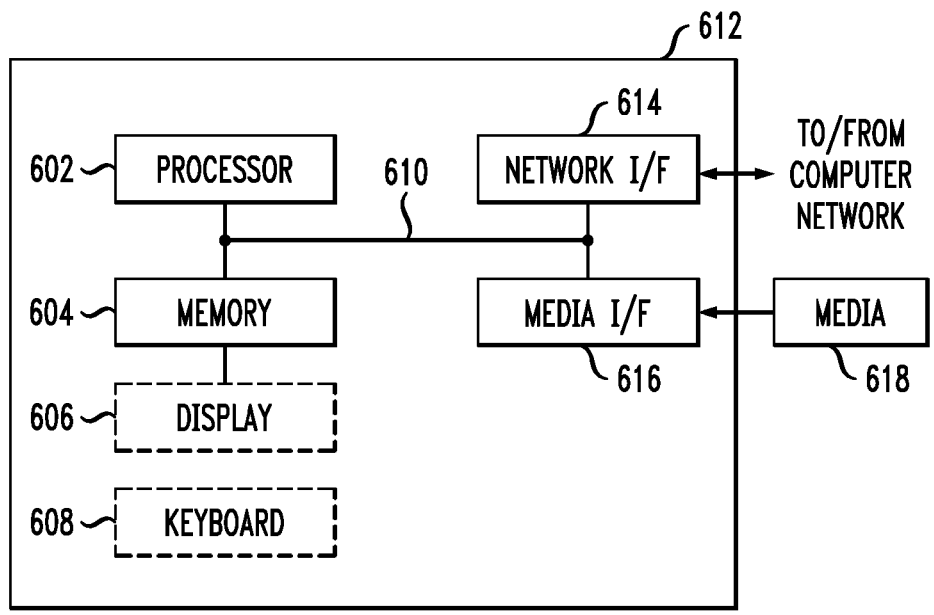
FIG. 6 is a system diagram of an exemplary computer system on which at least one embodiment of the invention can be implemented.

Additionally, an aspect of the present invention can make use of software running on a general purpose computer or workstation. With reference to FIG. 6, such an implementation might employ, for example, a processor 602, a memory 604, and an input/output interface formed, for example, by a display 606 and a keyboard 608. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 602, memory 604, and input/output interface such as display 606 and keyboard 608 can be interconnected, for example, via bus 610 as part of a data processing unit 612. Suitable interconnections, for example via bus 610, can also be provided to a network interface 614, such as a network card, which can be provided to interface with a computer network, and to a media interface 616, such as a diskette or CD-ROM drive, which can be provided to interface with media 618.

Accordingly, computer software including instructions or code for performing the methodologies of the invention, as described herein, may be stored in an associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 602 coupled directly or indirectly to memory elements 604 through a system bus 610. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 608, displays 606, pointing devices, and the like) can be coupled to the system either directly (such as via bus 610) or through intervening I/O controllers (omitted for clarity).

Network adapters such as network interface 614 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 612 as shown in FIG. 6) running a server program. It will be understood that such a physical server may or may not include a display and keyboard.

As noted, aspects of the present invention may take the form of a computer program product embodied in a computer readable medium having computer readable program code embodied thereon. Also, any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, RF, etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components shown in FIG. 2. The method steps can then be carried out using the distinct software modules and/or sub-modules of the system, as described above, executing on a hardware processor 602. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof; for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, to component, and/or group thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

At least one aspect of the present invention may provide a beneficial effect such as, for example, reducing the cost of collecting user data for adapting a translation engine in predefined ways, and accelerating the optimization algorithm to reach better results.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for customizing a natural language processing engine, wherein the method comprises:
    enabling selection of one or more parameters of a desired natural language processing task, the one or more parameters intended for use by a trained and an untrained user;
    mapping, using a trainable mapping method, the one or more selected parameters to a collection of one or more intervals of an input parameter to an optimization algorithm; and
    applying the optimization algorithm with the collection of one or more intervals of an input parameter to a model used by a natural language processing engine to produce a customized model;
    wherein said enabling, said mapping, and said applying are carried out by a computer device.

2. The method of claim 1, wherein enabling selection of one or more parameters of a desired natural language processing task comprises providing a user-interface for a user to select one or more parameters of a desired natural language processing task.

3. The method of claim 1, wherein the one or more parameters comprise at least one of length of a typical sentence, nature of content, quality of prose, number of expected interjections, intended use of a translation, and general topic of a text input.

4. The method of claim 1, wherein the one or more parameters comprise one or more pre-defined values.

5. The method of claim 4, wherein the mapping method is trained using data collected from one or more expert users.

6. The method of claim 1, wherein enabling selection of one or more parameters of a desired natural language processing task comprises enabling adjustment of relevance of one or more grammar components in the natural language processing task.

7. The method of claim 1, wherein the one or more selected parameters are automatically translated into an initial seed, with an upper and lower bound.

8. The method of claim 1, wherein a desired natural language processing task comprises a multilingual translation between a language pair.

9. The method of claim 1, further comprising:
    providing feedback to a user.

10. The method of claim 9, wherein providing feedback to a user comprises providing feedback in a form of a document with a translation from the original model and a translation from the customized model.

11. The method of claim 1, further comprising:
    applying a linear-regression algorithm to convert human input to transform an upper and lower bound for an optimization.

12. The method of claim 1, further comprising:
constructing a training set by collecting a collection of one or more documents, tuning at least one parameter of an optimizer for each document, and selecting the at least one tuned parameter to correspond to each document.

13. The method of claim 1, further comprising:
automatically analyzing a set of one or more representative documents and assigning a score to each document to be used in conjunction with a mapping method to identify one or more intervals for an optimization parameter.

14. The method of claim 1, further comprising:
providing a system, wherein the system comprises at least one distinct software module, each distinct software module being embodied on a tangible computer-readable recordable storage medium, and wherein the at least one distinct software module comprises an interface module, a conversion module and an optimization module executing on a hardware processor.

15. An article of manufacture comprising a computer readable storage medium having computer readable instructions tangibly embodied thereon which, when implemented, cause a computer to carry out a plurality of method steps comprising:
enabling selection of one or more parameters of a desired natural language processing task, the one or more parameters intended for use by a trained and an untrained user;
mapping, using a trainable mapping method, the one or more selected parameters to a collection of one or more intervals of an input parameter to an optimization algorithm; and
applying the optimization algorithm with the collection of one or more intervals of an input parameter to a model used by a natural language processing engine to produce a customized model.

16. The article of manufacture of claim 15, wherein enabling selection of one or more parameters of a desired natural language processing task comprises providing a user-interface for a user to select one or more parameters of a desired natural language processing task.

17. The article of manufacture of claim 15, wherein the one or more parameters comprise at least one of length of a typical sentence, nature of content, quality of prose, number of expected interjections, intended use of a translation, and general topic of a text input.

18. The article of manufacture of claim 15, wherein enabling selection of one or more parameters of a desired natural language processing task comprises enabling adjustment of relevance of one or more grammar components in the natural language processing task.

19. The article of manufacture of claim 15, wherein the one or more selected parameters are automatically translated into an initial seed, with an upper and lower bound.

20. A system for customizing a natural language processing engine, comprising:
at least one distinct software module, each distinct software module being embodied on a tangible computer-readable medium;
a memory; and
at least one processor coupled to the memory and operative for:
enabling selection of one or more parameters of a desired natural language processing task, the one or more parameters intended for use by a trained and an untrained user;
mapping, using a trainable mapping method, the one or more selected parameters to a collection of one or more intervals of an input parameter to an optimization algorithm; and
applying the optimization algorithm with the collection of one or more intervals of an input parameter to a model used by a natural language processing engine to produce a customized model.

21. The system of claim 20, wherein the at least one processor coupled to the memory operative for enabling selection of one or more parameters of a desired natural language processing task is further operative for providing a user-interface for a user to select one or more parameters of a desired natural language processing task.

22. The system of claim 20, wherein the one or more parameters comprise at least one of length of a typical sentence, nature of content, quality of prose, number of expected interjections, intended use of a translation, and general topic of a text input.

23. The system of claim 20, wherein the at least one processor coupled to the memory operative for enabling selection of one or more parameters of a desired natural language processing task is further operative for enabling adjustment of relevance of one or more grammar components in the natural language processing task.

24. The system of claim 20, wherein the one or more selected parameters are automatically translated into an initial seed, with an upper and lower bound.

* * * * *